Patented Jan. 1, 1952

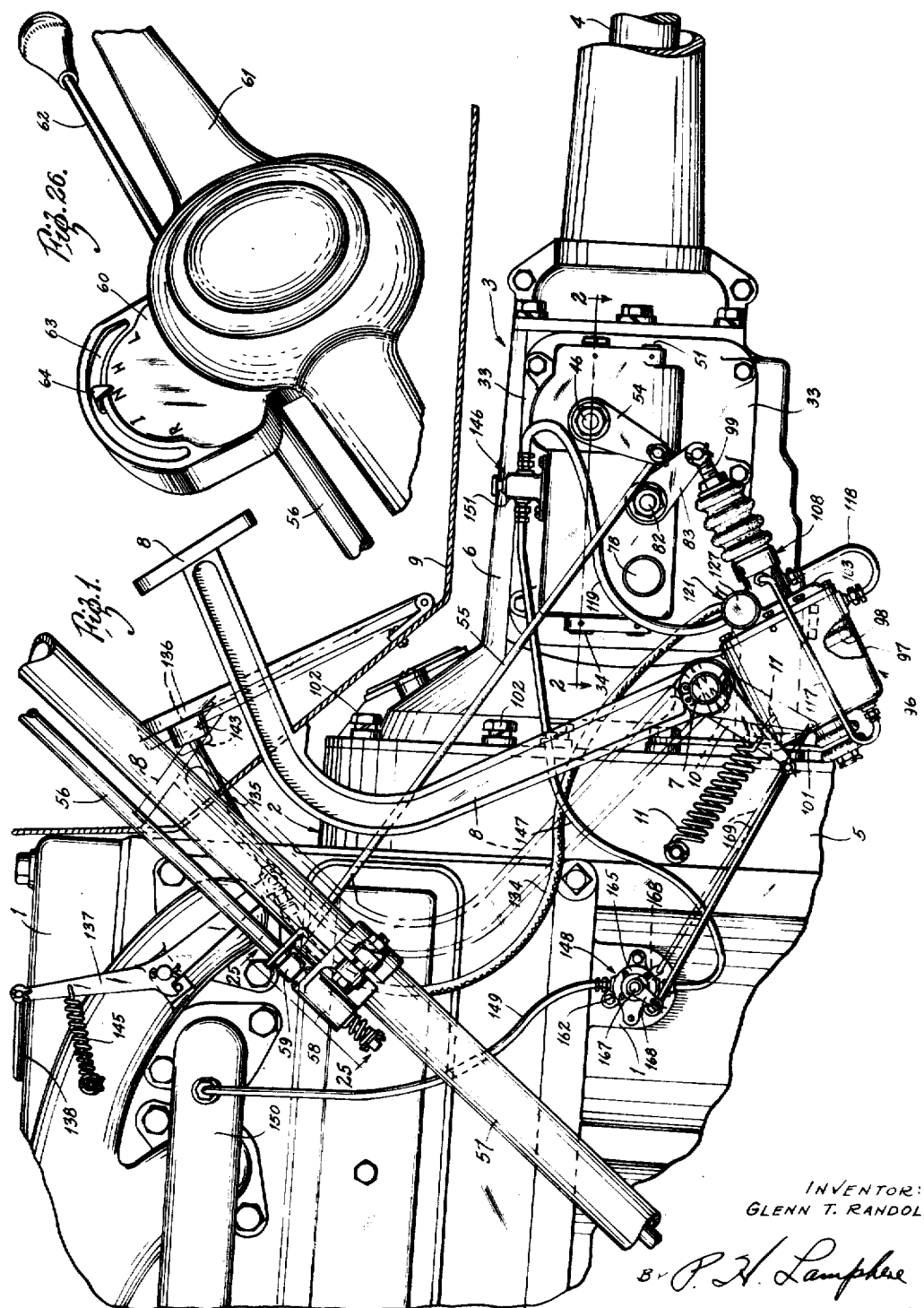

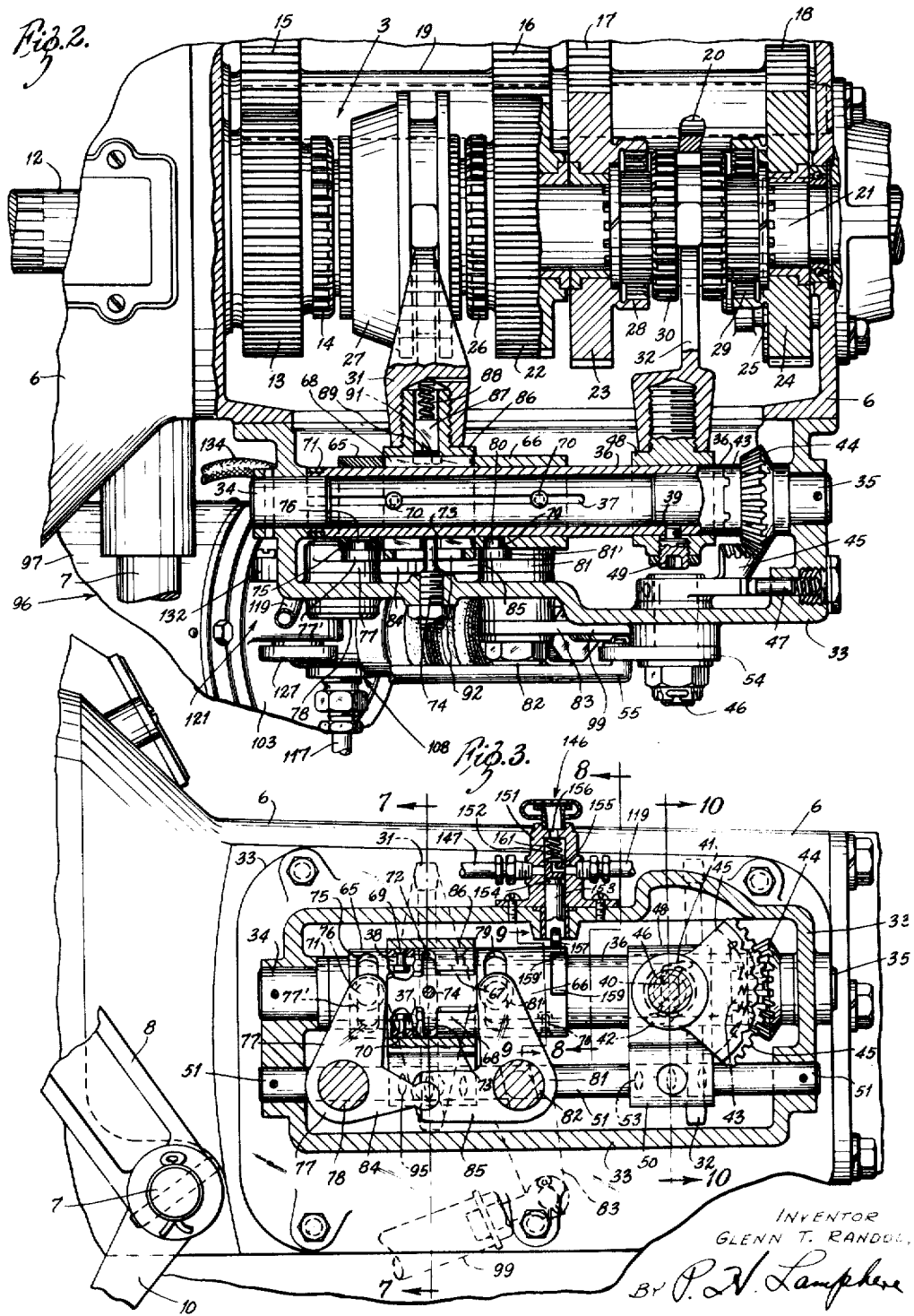

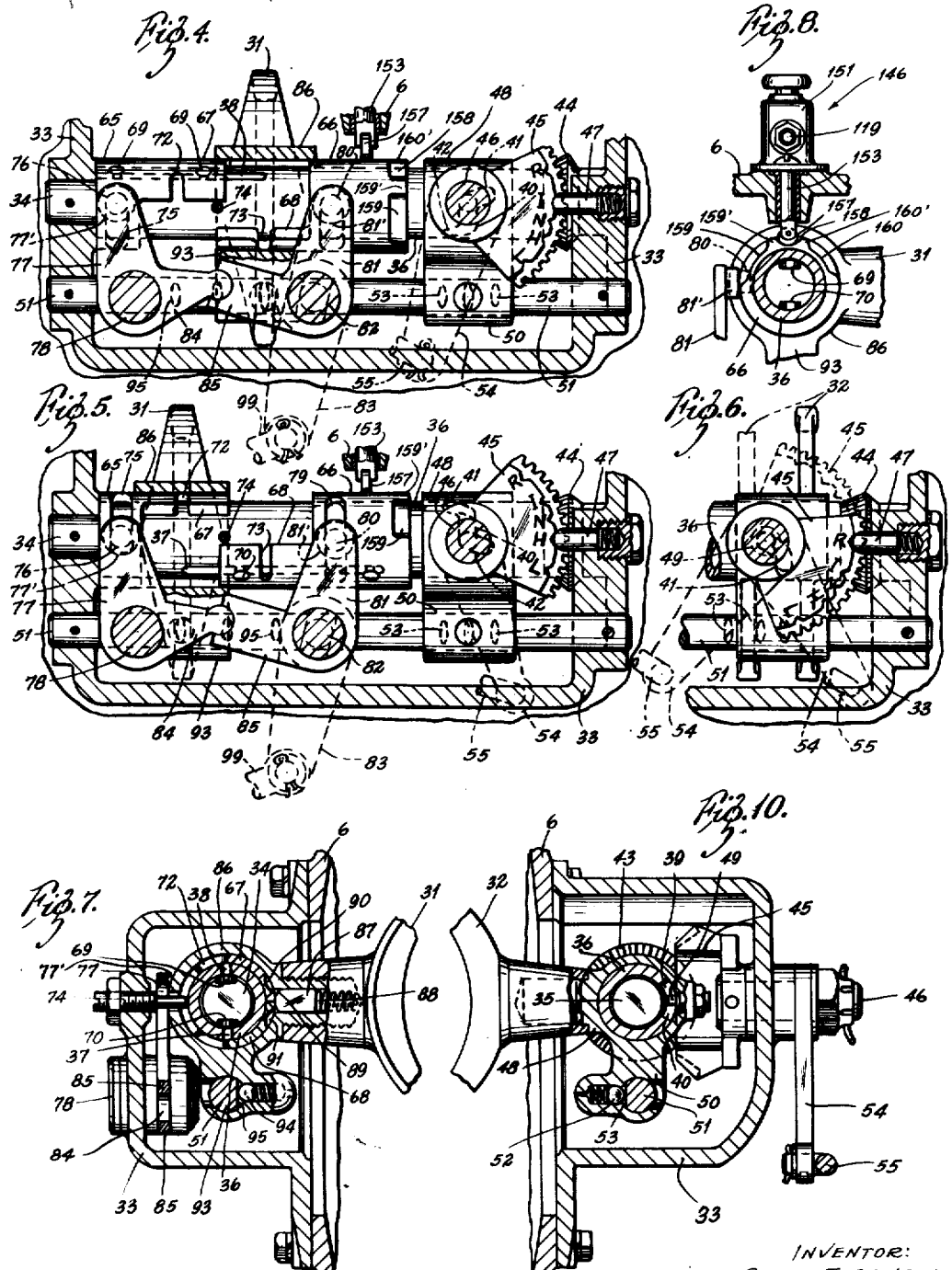

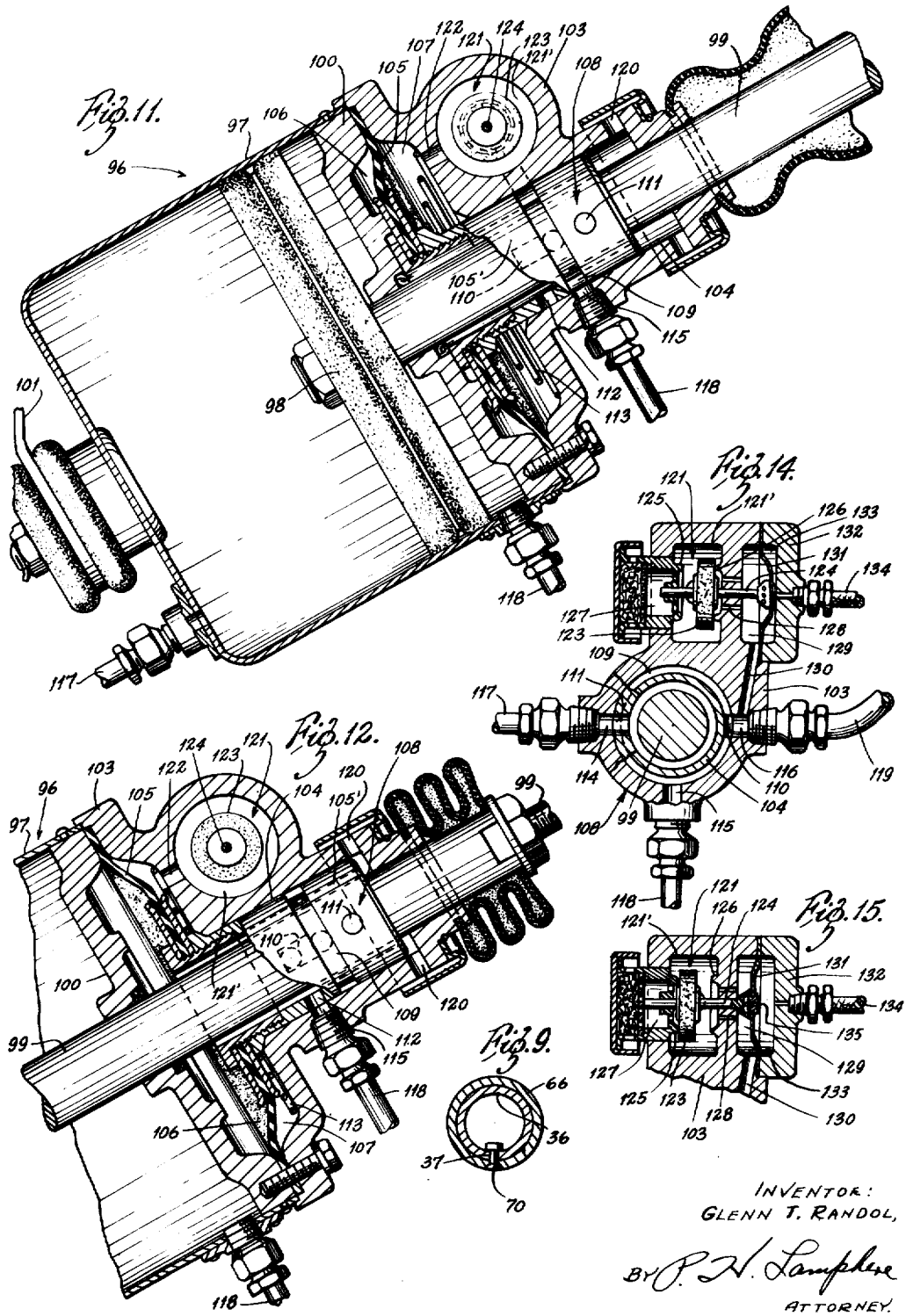

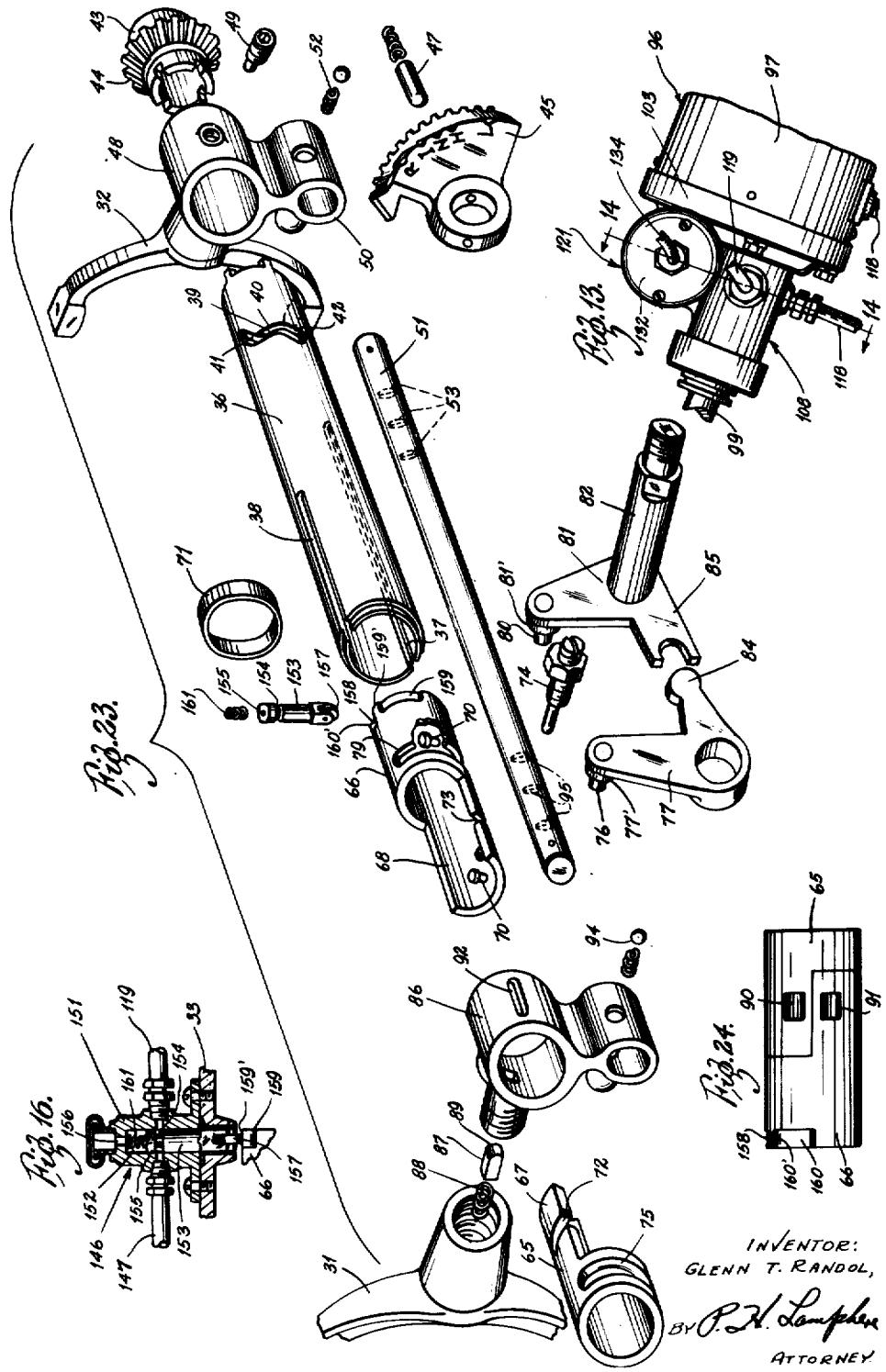

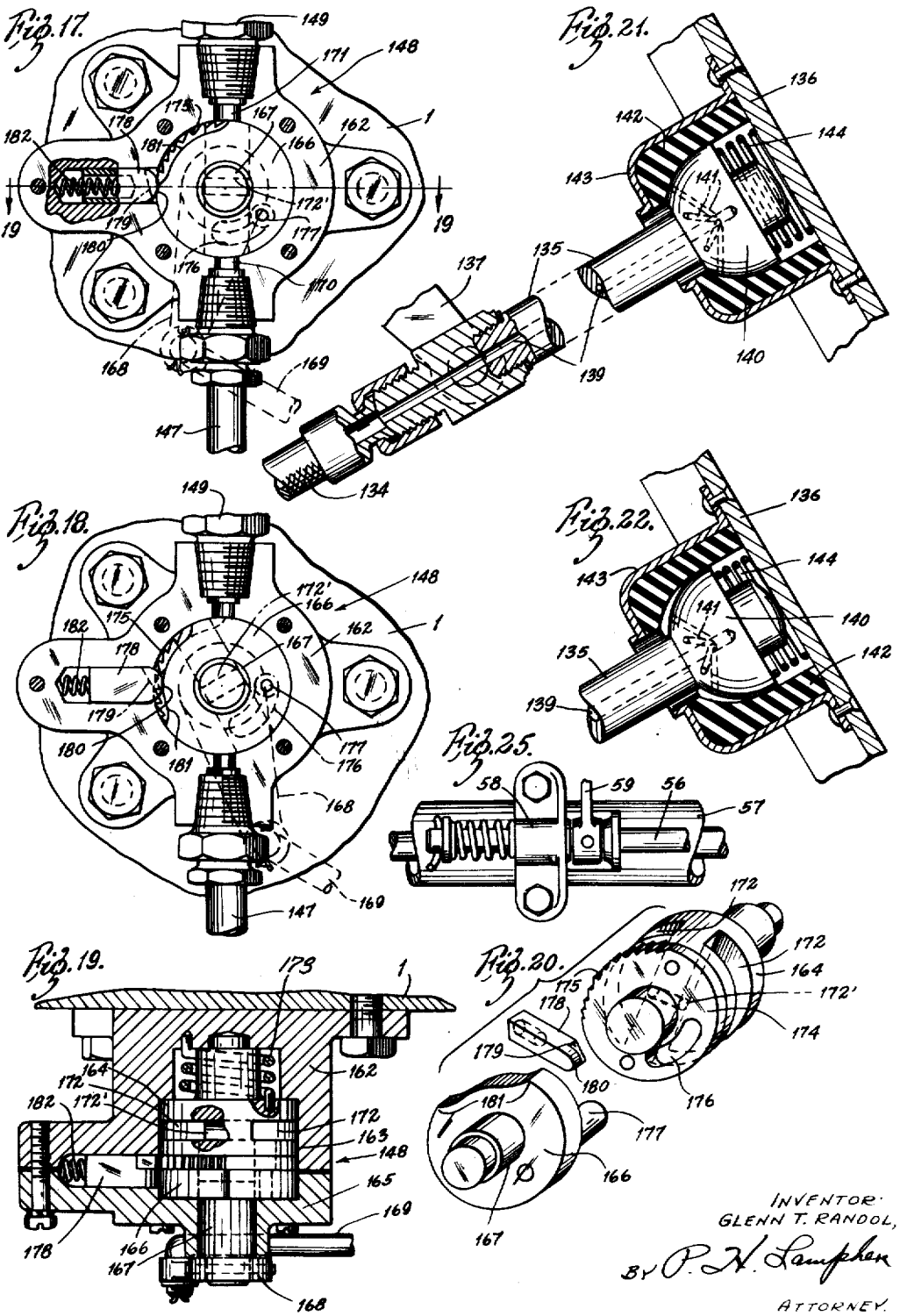

2,581,291

UNITED STATES PATENT OFFICE 2,581,291

PRESELECTIVE TRANSMISSION CONTROL

Glenn T. Randol, St. Louis, Mo.

Application August 5, 1944, Serial No. 548,161

34 Claims. (Cl. 192—.092)

This invention relates to transmission control in automotive vehicles, and particularly to that type of control in which preselection of the desired transmission speed drive is effected unrestrictively by a manually-controlled selector lever preferably located adjacent to the steering wheel.

Among the important objects of the invention is to produce an improved control mechanism for a change-speed gearing which will enable the operator to manually establish and neutralize certain gear ratios and preselect certain other power establishable gear ratios by means of a single control member.

An object related to that last stated is to provide an improved control mechanism for a change-speed gearing in which is embodied a motor-power device for performing certain preselected shifting operations, said motor device being controlled by valve means movable to two motor operating positions by restricted manipulation of a personally controlled member.

A more specific object related to the object immediately preceding is to adapt the aforementioned valve structure to control application of engine-vacuum to a speed changing servomotor of the vacuum-operated type, and for venting said servomotor to the atmosphere by minute successive movements of an automotive engine accelerator substantially within its engine idling control range.

More broadly, the control mechanism of the present invention is applicable to any desired type of change-speed power-train or drive mechanism, so that a more general object of this invention resides in the provision of an improved control means for utilizing a conventional throttle-controlling accelerator to control motor-power speed transitions in either up- or down-shifting, while at the same time most efficient and continuous use of high speed drive is obtained. Thus, power transition is caused, not by accelerator release as has been taught in the art, but rather by accelerator depression prior to engine operation to cause substantial vehicular acceleration. In this manner a speed drive may be activated before any substantial torque-load is imposed upon the vehicular driving components.

Still another object is to provide, in a fluid-pressure operated gearing control mechanism, means for operating a control valve for said fluid-pressure gear control by varying a fluid pressure effective on one side of a perforated movable member associated therewith.

A still further object is to provide an improved shut-off valve for embodying in a power-operated gear ratio changing mechanism, in such manner that said valve can be opened when a controlling element is moved to a predetermined position; but cannot be moved toward closed condition until the controlling element is moved back to a predetermined different position nearer the starting point thereof.

A further object of the invention is to provide an improved motor-power operated control mechanism for changing the gear ratios of an automotive vehicle gearing in which is embodied selecting means operable to select a gear ratio either prior to or following disengagement of the engine friction clutch, and wherein the gear ratios may be changed at will by the controlling of said power means and without the necessity of reengaging and disengaging the clutch for each gear ratio change.

A further specific object is to provide improved and simplified means for preselecting the gear ratios of a motor vehicle change-speed gearing.

A further object is to provide an improved preselective power-operated control mechanism for a change speed gearing whereby an operator can change gear ratios more silently and rapidly over a much wider range of vehicular speeds than by conventional manually-operated shifting mechanisms.

A further and basically novel object of the invention is to provide improved control mechanism for an automotive vehicle change-speed gearing and an associated friction clutch which will bring the vehicle substantially to a standstill accompanied by clutch disengagement without disturbing the active speed of the change-speed gearing despite the preselection of a different speed.

An important object related to that last stated is to provide improved control means for an automotive change-speed gearing and associated friction clutch wherein a manually-operated member is employed as a selecting means for determining the speed to be established, and a predetermined depressing movement of the accelerator pedal from its fully released engine idling position being required to cause the selected speed to become established.

A further important object of the invention is to provide improved control means for a change-speed transmission wherein releasing movement of the accelerator pedal from any depressed position thereof is ineffective to cause a change in the effective speed drive of the transmission.

An important object related to that last stated is to provide in change-speed gearing control, means whereby a shift from a higher speed to a lower speed, or vice versa, can be inaugurated at will by a predetermined depression of the accelerator pedal prior to opening the engine throttle in an accelerating direction from its engine idling position.

Another important object is to provide selective gearing changing made effective by depressing movements of the accelerator pedal mechanism prior to its normal engine operating range of movement.

A more specific object of the invention is to provide an improved change-speed gearing and associated friction clutch control wherein two different forward speed drives may be made selectively effective at will by control mechanism actuated by depressing or accelerating movements of the accelerator pedal from a fully released position through an engine idling range, and upon bringing the car to a stop with the foot removed from the accelerator pedal, the effective speed drive will not be disturbed, and wherein a downshift from the higher speed to the lower speed drive is obtained upon depression of the pedal prior to accelerating the engine.

Another important object of the invention is to provide improved transmission gearing control wherein the speed effective at the time of fully releasing the accelerator pedal to normal engine idling position will continue effective until the accelerator pedal is subsequently depressed at the will of the vehicle operator, and wherein said depressing movement of the pedal will cause the effective speed to be rendered ineffective and a new speed to be rendered effective according to selective control means, whether the new speed be a higher or lower speed than the prior effective speed.

Another important object of the invention is to provide improved control means for a change-speed shifting gearing wherein the speed selecting feature of the control means is effectuated by direct mechanical connection with a manually-controlled member for positive selecting operation, and wherein the speed selective operative positions of the aforesaid member for producing a shift are made effective by a movement of the accelerator pedal from its fully released engine idling position.

Another important object is to provide improved change-speed gearing control wherein an active speed will not be disturbed upon release of the accelerator mechanism from an open throttle position to an engine idling position notwithstanding a new speed may have been selected.

A further salient object of the invention is to provide improved change-speed gear and friction clutch control wherein the actuating movement of the control means therefor to either of its two operative positions is accomplished by a unidirectional movement of the accelerator pedal from a common predetermined normal position.

Another important object of the invention is to provide an improved accelerator actuated control for a change-speed gearing wherein a shift from a higher speed may be made while the vehicle is substantially at a standstill by a depressing movement of the accelerator pedal prior to accelerating the engine from idling speed condition so that maximum use of the economical higher speed is available throughout the entire engine accelerating range with resultant "non-clash" shifting to a lower speed upon depressing the accelerator pedal to accelerate or start the vehicle.

Another important object of the invention is to provide an improved control for a change-speed gearing and associated with a friction clutch wherein unidirectional depressing movements of the accelerator pedal from its fully released engine idling position or beyond will cause shifting of the change-speed gearing from a lower speed to a higher speed, or vice versa, upon disengaging the said clutch.

Other objects of the invention will become apparent from the following description taken in connection with the accompanying drawings, showing, by way of example, a vehicle change-speed gearing controlled by a mechanism embodying the invention.

In the drawings:

Figure 1 is a side view of a portion of a motor vehicle showing the improved control mechanism associated with the engine, its accelerator mechanism, the vehicle friction clutch and the change-speed gearing, the parts being shown in positions corresponding to neutral condition of the gearing, accelerator pedal released and clutch engaged;

Figure 2 is a sectional view through the gearing casing, said view being taken on approximately the line 2—2 of Figure 1;

Figure 3 is a side view of the parts of the control mechanism carried by the gearing casing cover, the parts being in neutral position with same being shown in section;

Figure 4 is a view similar to Figure 3 but showing the parts in the positions assumed when second or intermediate gear ratio is established;

Figure 5 is another view similar to Figure 3 but showing the parts in the positions assumed when high gear ratio is established;

Figure 6 is a view showing the position of some of the parts when reverse and low speed ratio are established;

Figures 7, 8, 9 and 10 are sectional views taken on the lines 7—7, 8—8, 9—9 and 10—10, respectively, of Figure 3;

Figure 11 is a sectional view of the fluid-pressure power device and associated control valve means;

Figure 12 is a sectional view similar to Figure 11 but showing the parts in another position assumed when a gear ratio is established by the fluid-pressure motor;

Figure 13 is a side view of the shift-motor valve means;

Figure 14 is a sectional view taken on the line 14—14 of Figure 13 and showing the valve parts in positions assumed when the gearing is in neutral and the accelerator mechanism is fully released;

Figure 15 is a view similar to Figure 14 but showing the other positions of the accelerator controlled valve parts;

Figure 16 is a sectional view of the shut-off valve similar to the showing thereof in Figure 3 but with the valve in open position;

Figure 17 is a view of the clutch pedal controlled valve with the cover removed, the parts being shown in valve closed position;

Figure 18 is a view similar to Figure 17 but showing the valve in the open position assumed when the clutch pedal is fully depressed to disengage the engine clutch;

Figure 19 is a sectional view taken on the lines 19—19 of Figure 17;

Figure 20 is a perspective exploded view of parts of the clutch pedal controlled valve;

Figure 21 is a sectional view of the accelerator pedal controlled valve, said valve being in closed position;

Figure 22 is a sectional view similar to Figure 21 but showing the valve in open position;

Figure 23 is an exploded perspective view of the control mechanism parts carried by the gearing casing cover;

Figure 24 is a side view of the two selecting sleeves showing particularly the recesses for selectively coupling the second and high speed shifter fork to the sleeves;

Figure 25 is a view taken on the line 24—24 of Figure 1 showing the parts mounted on the lower portion of the steering column; and Figure 26 is a perspective view of the gear-shifting lever and associated speed selection indicator mounted adjacent to the steering wheel.

Referring to the drawings in detail, and first to Figure 1, there is disclosed a typical drive assembly for a motor vehicle comprising an internal-combustion engine 1, a friction clutch 2, and a change-speed gearing 3 for transmitting power from the engine to the propeller shaft 4, which shaft is connected through the usual differential gearing to the rear driving wheels of the vehicle. The friction clutch (not shown in detail) is enclosed within a housing 5 interposed between the engine 1 and the gearing housing 6. This clutch is actuated by a clutch shaft 7 extending across and journaled in the bell-shaped forward portion of the gearing housing. The outer end of the shaft has secured thereto a control member shown by way of example as a clutch pedal 8 which extends through the floor 9 of the vehicle into the operator's compartment for ready operation by the vehicle operator. The clutch pedal has an integral downwardly extending arm 10 upon which acts a spring 11 normally biasing the clutch pedal toward clutch engaged position, which position is shown in Figure 1.

The vehicular power train thus comprises a prime mover, such as the illustrated internal-combustion engine; a torque transmitting coupling, such as the illustrated friction clutch; a change-speed device, such as the illustrated sliding gear transmission; a propeller shaft; a differential gearing; and a driving connection to the vehicular driving wheels. More specifically, the change-speed device itself may be referred to as a "power train" since the vehicular driving power is transmitted therethrough by means of a gear train or the like.

A change-speed gearing or "power train" with which this novel control mechanism may be associated is shown, by way of example in Figure 2. This gearing has a driving shaft 12 splined to the driven element of friction clutch and is journaled in the forward end wall of the gearing housing. On the inner end of this shaft is a driving gear 13 having integral clutch teeth 14 projecting from its rear side. The gear 13 is in constant mesh with a gear 15 for driving an intermediate or second speed gear 16, a low speed gear 17 and a reverse gear 18, all formed integral with a countershaft sleeve 19 rotatably mounted upon a spindle 20 extending through the gearing housing in a longitudinal direction and parallel to and at one side of the axis of the driving shaft 12. In axial alignment with the driving shaft 12 is a driven shaft 21 which is journaled at its rear end in the rear wall of the gearing housing and at its forward end piloted into the driving shaft 12 in a manner well known in the art. The intermediate portion of this driven shaft has rotatably mounted thereon an intermediate speed gear 22 and a low speed gear 23, the former constantly meshing with the countershaft gear 16 and the latter with the countershaft gear 17 to establish, respectively, the intermediate speed drive and the low speed drive. The rear end of the driven shaft has rotatably mounted thereon a reverse gear 24 which constantly meshes with an idler gear 25, said idler gear in turn constantly meshing with the countershaft gear 18 to thus produce a reverse speed drive. The intermediate gear 22 is provided with integral clutch teeth 26 on its forward face, and interposed between these clutch teeth and the previously mentioned clutch teeth 14 of the driving gear 13 is a double clutch element 27 which is splined to the driven shaft for sliding movement thereon. The arrangement is such that, when the clutch element is moved forwardly, the driven shaft will be directly clutched to the driving shaft to produce high or direct speed drive; and when the clutch element is moved rearwardly, the intermediate gear 22 will be connected to the driven shaft to produce intermediate or second speed between the driving shaft and driven shaft. The opposed ends of the low speed gear 23 and the reverse gear 24 are provided with integral clutch teeth 28 and 29, respectively, and selectively cooperating with these teeth is a double clutch element 30 splined to the driven shaft for axial sliding movement thereon. When this clutch element 30 is moved forwardly, the low speed gear 23 will be connected to the driven shaft for low speed; and when the clutch element is moved rearwardly, the reverse gear 24 will be connected to the driven shaft for reverse speed. The double clutch element 27 is controlled by a shifting fork 31 and the double clutch element 30 is controlled by a shifting fork 32.

The gearing housing is open at one side, and closing this opening is a cover housing, or plate, 33 bolted to the gearing housing 6. The ends of this cover plate adjacent their top portions carry aligned fixed pins 34 and 35 which project into the chamber formed by the cover plate, which is of general rectangular cup-shaped formation. Rotatably mounted on these pins is a cylindrical selecting shaft 36, the forward portion of which is provided with diametrically positioned axially extending slots 37 and 38 and the rear portion is provided with a specially formed cam slot 39 of somewhat S-shape having a straight intermediate portion 40 from which extend in opposite directions the end portions 41 and 42. The rear end of the shaft is arranged to be clutched to a collar 43 journaled on the pin 35 and provided with a beveled gear 44. This beveled gear constantly meshes with a beveled gear segment 45 secured to the inner end of a short shaft 46 journaled in the cover 33. The arrangement of the beveled gears will thus cause rotation of the hollow shaft whenever the shaft 46 is rotated.

The beveled gear segment 45 is provided with a collar having an arcuate segment in which are formed five notches indicated by the letters R, I, N, H and L, and cooperating with these notches is a spring biased detent 47. The notches and detent yieldably hold the beveled gear segment in any of the five positions to which it is capable of being moved by the shaft 46, said positions corresponding to reverse gear, intermediate or second speed, neutral, high speed and low speed conditions of the gearing.

The rear portion of the cylindrical shaft 36 immediately adjacent the collar 43 carries a collar 48 to which is secured the previously mentioned shifting fork 32 for the double clutch element 30. Carried by the collar is a pin 49 which extends into and cooperates with the S-shaped cam slot 39, thus providing an arrangement whereby rotation of the shaft 36 can move the collar 48 and the shifting fork 32 axially on the shaft. The collar 48 is prevented from turning on the shaft 36 by an integral extension 50 which receives a stationary rod 51 positioned parallel with and below the hollow shaft 36. This extension carries a yieldable detent 52 of the ball type which is arranged to cooperate with three notches 53 in the rod, thus yieldably holding the collar 48 and the shifting fork 32 in its three different positions; namely, neutral, reverse gear ratio and low gear ratio.

If the shaft 36 is so rotated that the end portion 41 of the cam slot 39 receives the pin 49, reverse speed will be established. If the shaft 36 is rotated so that the end portion 42 of the cam slot 39 receives the pin 49, low speed will be established. When the shaft 36 is positioned so that the pin 49 is medially in the straight portion 40 of the cam slot, the shifting fork will be in its neutral position and neither the reverse speed or the low speed will be established. The straight portion 40 of the slot is of such length as to accommodate a predetermined amount of free rotation of the shaft 36 prior to any movement of the gear shifting fork 32. This free movement is present to accommodate the control of the preselecting of second and high gear ratios in a manner which will become apparent, the second and high speed ratios being preselected when the shaft 36 is turned to positions wherein the pin is at the ends of the straight portion 40 of the cam slot.

The shaft 36 is manually rotated from the operator's compartment. This is accomplished by providing the outer end of the shaft 46 with an arm 54 to which is connected a rod 55 actuated by a steering column mounted control shaft 56, as best shown in Figure 1. The lower end of this shaft 56 is journaled in a bracket 58 secured to the steering column 57, and adjacent this bracket the shaft carries an arm 59 to which the rod 55 is connected (see Figure 25). The upper end of the shaft 56, as best shown in Figure 26, is journaled in an indicator bracket 60 carried by the steering column just below the steering wheel 61. The shaft is rotated by a gear-shift handle or lever 62 which extends laterally from the steering column in a plane below the steering wheel. The bracket 60 is provided with a slot 63 adjacent to which are the indicia R, I, N, H and L for cooperation with a pointer 64 secured to the shaft 56 and rotatable therewith.

When the gear-shift lever is in a position wherein the pointer 64 is opposite N, the gearing will be in neutral condition, and the detent 47 will be in the N notch of the segment gear 45. When the gear-shift lever is moved so that the pointer is at the R position, which is at one end of the slot 63, the gearing will be placed in reverse speed, since under these conditions the shaft 36 will be so rotated that the pin will enter the end 41 of the cam slot 39. When the gear-shift lever is moved so that the pointer is opposite L, the shaft 36 will be so moved that the gearing will be placed in low speed, this being brought about by the pin 49 moving into the end 42 of the cam slot 39. When the reverse speed and the low speed are established, the detent 47 will be in the R and L notches, respectively. Also, the detent 52 will be in an end notch to aid in yieldably holding the shifting fork in the speed drive positions.

The forward portion of the cylindrical selecting shaft 36, in which is provided the opposed slots 37 and 38, carries two selecting sleeves 65 and 66 (see Figures 23 and 24). The sleeve 65 is formed with a finger portion 67, and the sleeve 66 is formed with a finger portion 68. These finger portions are arranged to be in overlapping relation and on opposite sides of the cylindrical shaft. Sleeve 65 carries pins 69 (see Figures 3 and 4) for cooperation with the slot 38 in the shaft, thus insuring that the sleeve will be rotated with the shaft and at the same time be free to have relative longitudinal movement. In a similar manner, the sleeve 66 is provided with pins 70 for cooperation with the slot 37 to thus cause the sleeve to rotate with the shaft and yet be free for relative longitudinal movement. A band 71 on the end of the hollow shaft 36 prevents the slotted portion of the shaft from becoming deformed and also closes the forward ends of the slots.

The overlapping arrangement of the fingers is such that the finger 67 lies on the top of the shaft 36 and the finger 68 lies on the bottom of the shaft. The edges of these fingers, which are on the side of the shaft toward the gearing, are arranged to be in juxtaposition, as best indicated in Figures 7 and 24. The other edges of the fingers, which lie on the outer side of the shaft 36, are arranged to be in spaced relation, as clearly indicated in Figures 3, 4 and 5. These latter spaced edges are provided with opposed notches, the finger 67 having the notch 72 and the finger 68 having the notch 73. When the sleeves 65 and 66 are in their innermost positions as accommodated by the relative axial movement between their fingers, the notches 72 and 73 will be opposite each other (as shown in Figure 3) and in a condition to receive a stationary pin 74 which is carried by the cover plate (Figures 2 and 7). The purpose of this pin is to mechanically lock the sleeves against longitudinal movement whenever the pin is in either of the slots. The pin, however, only enters the slots when the shaft 36 is rotated to its extreme positions, which are necessary to place the gearing in reverse speed and low speed, as already noted. When the shaft 36 is rotated so that the pin 49 remains in the straight portion 40 of the cam slot, the pin 74 will not enter either of the slots 72 or 73, and thus the sleeves 65 and 66 will be free to have relative longitudinal movement away from each other under these conditions. Such condition will be present when the gear-shift lever is in the N position or has been moved to either the I or H positions.

The sleeve 65 is provided with a semi-annular slot 75 which receives a pin 76 carried by the upright arm of a bell crank lever 77 pivotally mounted on the cover plate by means of a pin 78. Similarly, the sleeve 66 is provided with a semi-annular slot 79 which receives a pin 80 carried by the upright arm of a second bell crank lever 81 secured to the inner end of a shaft 82 journaled in the cover plate. The upper ends of the upright arms of the bell crank levers 77 and 81 are formed into laterally projecting circular bosses 77' and 81', respectively, for neutralizing the second and high gear shifting fork 31 under certain operating conditions in a manner to be described later. The outer end of this shaft 82 carries an actuating arm 83 whereby the shaft and bell crank 81 may be rotated from the exterior. The bell crank levers 77 and 81 are connected together so that the bell crank lever 77 will be rotated simultaneously with the bell crank lever 81. This connection is accomplished by an interlocking of the horizontal arms of the aforementioned levers. The connection comprises a rounded end 84 carried by the bell crank lever 77 and an end slot 85 carried by the bell crank lever 81. From the arrangement of the bell crank levers and their connection with the sleeves, it is seen that by a rotation of the shaft 82 in a clockwise direction (as seen from the outer side of the cover plate) the sleeves 65 and 66 can be moved away from each other, and by a reverse rotation of the shaft the sleeves can be moved toward each other.

A collar 86 surrounds the selecting sleeves 65 and 66, and secured to this collar is the previously mentioned shifting fork 31 which controls the movement of the double clutch element 27. The collar 86 is arranged to be selectively connected to the sleeves 65 and 66, and the structure shown to accomplish this comprises a locking pin 87 carried by the collar and backed by a spring 88. The outer end of the locking pin has a rounded nose 89 and flat opposed sides. This end is arranged to cooperate with a recess 90 in the finger 67 or with a recess 91 in the finger 68 (see Figure 24). These recesses have straight side walls so that the flat sides of the locking pin can cooperate therewith and provide a locking arrangement between the collar carrying the shifting fork and the sleeves 65 and 66, depending upon which recess the detent engages. The recesses 90 and 91 are arranged so as to be slightly spaced from the juxtapositioned edges of the fingers, thus providing a surface on the fingers between the two recesses upon which the end of the locking pin can ride. When the pin is between the recesses, neither sleeve 65 nor 66 will be connected with the shifting fork, and the pin 49 will be in the middle of the straight portion 40 of the slot 39 which operates the low and reverse gear shifting fork 32. This condition will prevail when the gear-shift lever is in its neutral position with the pointer 64 opposite the letter N. If the gear-shift lever should be moved so that the pointer is opposite the letter I, then the shaft 36 will be given such a rotation that the locking pin 87 will engage in the recess 91 and thus connect the collar 86 and the gear shifting fork to the sleeve 66 for longitudinal movement therewith. If the gear-shift lever should be moved to the position wherein the pointer is opposite H, then the shaft 36 will be given such a rotation that the locking pin 87 will engage in the recess 90 to connect the collar 86 and the gear shifting fork with the sleeve 65 for longitudinal movement therewith.

The collar 86 has an axially extending slot 92 through which extends the previously mentioned pin 74 so that the latter will be in a position to cooperate with the circumferential slots 72 and 73 in the fingers 67 and 68, respectively. The collar 86 is held from rotation by being provided with an integral portion 93 which receives the previously mentioned rod 51. This portion 93 carries a spring biased ball detent 94 which cooperates with three recesses 95 in the rod for yieldably holding the collar and shifting fork 31 in the three different positions they can assume; namely, intermediate, high and neutral.

The shaft 82, which is employed to simultaneously rotate the bell crank levers and connected selecting sleeves 65 and 66 toward and away from each other, is arranged to be power-operated, the power means or servo-mechanism employed in the preferred construction that is herein described and illustrated, being a vacuum-operated power cylinder 96 mounted on the exterior of the cover plate and gearing housing. This power cylinder is double acting and, as best shown in Figure 12, comprises a cylinder 97 closed at both ends and having reciprocable therein a piston 98. A piston rod 99 extends through the rear end closure plate 100 of the cylinder and is connected to the previously mentioned arm 83 secured to the outer end of the shaft 82. A suitable bracket 101 supports the forward end of the cylinder from the gearing housing, the same nuts 102, which are employed to connect the gear housing to the clutch housing, being employed.

The end closure plate 100 of the cylinder has secured thereto a housing member 103 having a bore 104 through which the piston rod 99 extends. The housing 103 and the plate 100 are arranged to form a chamber in which is a flexible vacuum-energized diaphragm 105 clamped between the plate 100 and the housing and dividing said chamber into two chambers 106 and 107. The inner portion of this diaphragm 105 is operably connected to a sleeve valve element 105' of a distributing valve 108, said element being slidable in the bore 104 of the housing 103 and constructed to be in spaced relation with the piston rod. This sleeve valve element is formed with an annular groove 109 and a connecting longitudinally extending groove 110. The sleeve also is provided with holes 111 and 112 extending completely therethrough, said holes being on opposite sides of the groove 109 and circumferentially spaced as shown. The sleeve 108 is acted upon by a spring 113 within the chamber 107, which biases the sleeve to the position shown in Figure 11.

The housing 103 is formed with three ports 114, 115 and 116, spaced, for example, 90° apart, as shown in Figure 14. The port 114 is connected by a pipe 117 with the forward end of the power cylinder, the port 115 is connected by a pipe 118 to the rear end of the servomotor 96, and the port 116 is connected by a pipe 119 to a source of pressure which, in this particular embodiment of the invention, is a source of sub-atmospheric pressure or vacuum, and comprises an inlet manifold 150 of the engine with which the gearing and the control mechanism are associated. The annular groove 109 in the valve operation is arranged to cooperate with the port 115 and the port 114, the groove being opposite the port 115 when the sleeve is in the biased position shown in Figure 11. The groove 109 will be opposite the port 114 when the sleeve is moved to the right from the position shown in Figure 11 to the position shown in Figure 12. The port 116, which is connected to the source of fluid pressure, will communicate with the groove 109 in both the positions shown in Figures 11 and 12, this being brought about by the longitudinal groove 110. The hole 111 will be opposite the port 114 when the sleeve is in the position shown in Figure 11, thus connecting the front end of the servo-cylinder with atmosphere by way of the space between the sleeve and the piston rod and the openings 120 at the end of the bore 104. In the position shown in Figure 12, the hole 112 is opposite the port 115, thus placing the rear end of the servo-cylinder in communication with atmosphere.

The housing 103 is so constructed as to carry a control valve for operating the distributing valve, which control valve will be referred to as a selector valve, and generally indicated by the numeral 121. A selector valve chamber 121' is formed in the housing and is constantly communicating, by a passage 122, with the chamber 107 at the right hand side of the diaphragm, as viewed in Figure 11. Within the valve chamber is a valve element 123 which is mounted upon a stem 124. This valve element is arranged to move back and forth in cooperation with seats 125 and 126. When the valve element is engaging the seat 126, as shown in Figure 14, the valve chamber 121' and the chamber 107 will be placed in communication with the atmosphere through an air filter plug 127 which carries on its inner end the valve seat 125. When the valve element engages this seat 125, the valve chamber 121' and the chamber 107 will be in communication with the source of sub-atmospheric pressure. This communication is brought about by way of passages 128 entering the chamber 121' through the valve seat 126, a chamber 129 and a passage 130 connecting into the port 116 (see Figure 14). The chamber 129 is formed by a flexibly sensitive diaphragm 131 clamped to the housing 103 by a cup-shaped cover 132. The diaphragm and the cup-shaped member form a chamber 133 opposite the chamber 129. This chamber 133 is in constant communication with a flexible pipe 134 having a relatively small passage centrally therethrough, the purpose of which will become apparent. As best shown in Figure 15, the chambers 129 and 133 on opposite sides of the diaphragm 131 are arranged to have communication with each other by way of a restricted passage 135. The diaphragm 131 is employed to control the operation of the valve element 123 by changing the fluid pressure effective in the chambers on opposite sides thereof. If the conduit 134 should be closed off from any atmospheric connection, then the fluid pressures in the chambers 129 and 133 on opposite sides of the diaphragm will be equalized due to the connecting passage 135, the pressure being that at port 116 when connected to the source of sub-atmospheric pressure. Under such conditions, the diaphragm, which has some resiliency, will hold the valve element 123 in the position shown in Figure 14. Under such conditions, the chamber 107 will be connected to atmosphere and the spring 113 is effective to place the valve sleeve element 105' of the distributing valve 108 in the position shown in Figure 11. However, if the chamber 133 should be connected to atmosphere, the pressure therein will become superior to the pressure in the chamber 129, and, consequently, the diaphragm will be moved quickly to the left to the position shown in Figure 15. This will cause the valve element 123 to disconnect the chamber 107 from atmosphere and connect it with the source of sub-atmospheric pressure which is effective in the chamber 129. Consequently the pressures acting on the opposite sides of the distributing valve diaphragm 105 will be so unbalanced that this diaphragm will be moved against the diaphragm spring 113 to the position shown in Figure 12, thereby placing the sleeve 105' in its second position, as shown in Figure 12.

The controlling of the connection of the chamber 133 to atmosphere is accomplished by predetermined positions of an operator-operatable member, or more specifically the accelerator pedal effective prior to accelerating the engine above idling speed. As shown in Figure 21, the flexible pipe 134 is connected to a two part stem 135 forming a connection between the accelerator pedal 136 in the operator's compartment and the bell crank lever 137 which is pivoted to the side of the engine and is connected by a rod 138 with the usual butterfly valve of the carburetor controlling the intake of fuel to the engine. The stem 135 has a small passage 139 with which the pipe 134 communicates. This passage leads into a semi-spherical knob or control element 140 formed on the end of the stem, and from which a plurality of small angular passages 141 lead to the surface of the knob. Cooperating with the spherical surface of the knob is a cup-shaped rubber element 142 enclosed in a cup-shaped casing 143 secured to the accelerator pedal 136. A spring 144 is interposed between the knob end of the stem and the accelerator pedal to thus normally so bias the cup-shaped rubber member 142 and the knob that the spherical surfaces thereof will be engaged and the small passages 141 closed off from atmosphere. These passages, however, will be opened if the accelerator pedal 136 is depressed only slightly, that is, sufficiently to compress the spring 144 to cause a relative movement between the accelerator pedal and the stem. When the passages 141 are opened, the chamber 133 will be placed in communication with atmosphere, and consequently the selector valve will be so operated that the valve element 123 will assume the position shown in Figure 15, as already noted. The spring 144 is of such strength that it will be compressed to accommodate separation of the knob and the cup-shaped member 142 without any movement of the bell crank lever 137 and its connection to the carburetor. In order that a sufficient resistance may be given to the movement of the accelerator mechanism connected to the carburetor, a spring 145 stronger than spring 144 is shown employed in association with the bell crank lever 137. The slight depressing movement of the accelerator pedal from its fully released engine idling position as shown in Figure 1, to control the valve 140—142 is the transmission controlling range of movement of said pedal, as will be apparent from the structure shown and described, because this movement occurs prior to accelerating the engine above idling speed. The valve will be closed; i. e., the knob 140 seated on element 142, when the pedal is in its normally released engine idling position as best shown in Figure 21. The valve will be open (knob unseated) to cause a preselected speed change to occur when the pedal is depressed slightly toward engine accelerating range of movement as best shown in Figure 22. Thus the control of the valve is substantially between the fully released engine idling position of the accelerator pedal and the position wherein engine speed initially increases above idling speed.

As shown in Figure 1, the pipe 119, through which sub-atmospheric pressure enters the housing 103 and the power cylinder, leads to a shut-off or limiting valve 146 mounted on top of the cover for the gear housing. Leading from this shut-off valve is another pipe 147 which is connected to a second shut-off valve 148 mounted on the side of the engine and arranged to be controlled by the clutch pedal 8. From this shut-off valve 148, a pipe 149 leads to the intake manifold 150 of the internal-combustion engine.

The first valve 146 is primarily controlled by the operating characteristics of the change-speed drive mechanism 3, while the second valve 148 is primarily controlled by the operator through the medium of the clutch controlling pedal 8. Of course, the control of the transmission is personal with the operator, and the valve 146 is in this sense a personally-operable control means inasmuch as it can be overruled by actuation of the gear-shift lever 62.

The shut-off valve 146, shown in detail in Figures 3, 8 and 16, is arranged to be controlled by the rotation of the sleeve 66. The valve comprises a casing member 151 secured to the top wall of the gear housing cover 33. The pipe 119 is connected to one side of this housing, and the pipe 147 to the opposite side of the housing. The housing is provided with a bore 152 in which is a slidable valve element 153 having an annular groove 154 and an L-shaped passage 155 above the groove. The upper end of the passage communicates with atmosphere through a passage 156 at the end of the bore. The lower end of the valve stem projects through the wall of the cover plate and carries a small roller 157. This roller cooperates with the sleeve 66, which is provided with a central depression 158 (neutral), and depressions 159 and 160 on each side thereof.

The depression 158 is arranged to receive the roller when the shaft 36 is in the neutral position, that is, the position corresponding to the gear-shift lever pointer indicating N. This condition is illustrated in Figure 8, and when such prevails the valve stem will be biased by its spring 161 to the position indicated in Figure 3 wherein the L-shaped passage will so cooperate with the pipe 119 as to place this pipe in communication with atmosphere. This is the shut-off position of the valve, that is, it now prevents communication between the pipes 147 and 119 and places the pipe 119 in communication with atmosphere. When the shaft 36 is rotated to positions corresponding to either the H or I positions of the gear-shifting lever pointer, the roller on the end of the stem will ride up onto the normal surface of the sleeve 66 at 159' and 160', respectively, and thus move the valve stem upwardly so as to bring the annular groove 154 in registry with the pipes 147 and 119 to establish communication therebetween. This condition is shown in Figure 16, and is the open position of the shut-off valve. If the gear-shift lever should be moved to positions wherein the pointer is at the R or L positions; that is, to establish low or reverse speed ratios, the valve stem will again assume the shut-off position shown in Figure 3 wherein groove 154 is out of registry with pipes 147—119, since the roller on the end of the stem will then drop into the depressions 159 or 160. Thus it is seen that the valve will always be in the shut-off position except when the gear-shift lever is set in either high or intermediate drive position. It will also be noted that the arrangement for operating the valve stem will not interfere with the reciprocation of the sleeve 65 and 66. The sleeves can only be reciprocated by operation of the shift-motor 96, and this motor 96 can only be operated when the shut-off valve 146 is open. During the open condition of the shut-off valve, the roller will be riding on the surface of the sleeve 66, and thus the sleeve 66 will be free to slide axially beneath the roller of the valve stem. But in the shut-off position of the valve, the stem 153 not only disables the power cylinder 96 but also mechanically locks the sleeves 65 and 66 against accidental axial movement from their central positions, as shown in Figures 2 and 3, due to the side of the roller 157 selectively engaging the straight sides of the end walls of the depressions 158, 159 and 160.

The clutch pedal operated shut-off valve 148 is of special construction and is illustrated in detail in Figures 17 to 20. The valve mechanism comprises a body 162 bolted to the engine, and this body has a cylindrical bore 163 into which is mounted a rotatable valve element 164. Cooperating with the valve body is a cover 165 which has rotatably mounted therein a cylindrical actuating disc 166 provided with a stub shaft 167 extending to the exterior of the cover. This shaft on its outer end carries an arm 168 which is connected by the rod 169 to the arm 10 of the clutch pedal.

The valve body has a port 170 to which the pipe 147 is connected and a diametrically positioned port 171 to which the pipe 149 is connected. The valve element 164 is provided with a pair of oppositely disposed C-shaped slots 172 interconnected by a cross passage 172' which establish communication between the pipes 149 and 147 when the valve element is in its open position as shown in Figure 18. The valve is closed and communication between the pipes 149 and 147 is cut off when the valve element is so positioned that the portions of the valve element between the ends of the C-shaped slots are disposed over the ports 170 and 171. A torsional spring 173 is connected at one end to the valve element, and at the other end to the valve body, and normally biases the valve element toward closed position, which position is shown in Figures 17 and 19.

The valve element on its end adjacent the disc 166 has secured thereto a disc 174, a portion of the periphery of which is provided with ratchet teeth 175. This disc has a curved slot 176 which receives a pin 177 carried by the actuating disc or member 166. The pin and slot arrangement accommodates relative movement between the actuating member and the valve element, which functions so that the valve can be held open while the clutch pedal is partially released to initially reengage the clutch. Carried by the body and the cover of the valve is a slidable dog 178 which has on its end a V-shaped portion 179 and a rounded portion 180. The V-shaped portion is arranged to cooperate with the ratchet teeth 175 on the disc 174 and prevent rotation of the valve element 164 in a clockwise direction (as viewed in Figure 17) under certain conditions. The rounded end 180 is arranged to cooperate with a cam surface 181 on the actuating disc 166.

When the clutch pedal is in the clutch engaged position, that is, when it is released, the shut-off valve 148 will be conditioned as shown in Figures 17 and 19. Under such conditions, the port 147 will be closed off by the valve element 164. The pin 177 will be against the upper end of the slot 176 due to the action of the torsional spring 173, the pin thus acting as a stop to hold the valve element in the shut-off position. The shut-off valve will be opened by depressing the clutch pedal, and this open condition is shown in Figure 18. When the clutch pedal is depressed, the actuating disc 166 will be given a clockwise rotation, as viewed in Figures 17 and 18. Since the pin 177 is at the upper end of the slot 176, rotation of the disc 166 will also rotate the valve element 164, and, when the clutch pedal reaches its fully depressed position beyond the point where it disengages the clutch, the valve will be fully open as shown in Figure 18, it being noted that the C-shaped slots 172 have now been placed in communication with the ports 170 and 171 to connect these ports. During the rotation of the valve element to open position, the V-shaped end of the dog 178 ratchets over the teeth 175 and then engages in a tooth to prevent clockwise movement of the valve element. The dog is released to assume an engaged position with the teeth when the valve is opened since the cam surface 181 is placed opposite the rounded end 180 of the dog, thus freeing the dog to move inwardly under the action of its spring 182. The dog, however, does not have any effect in preventing the return movement of the clutch pedal to control reengagement of the clutch, due to the fact that the pin 177 can move backward in the slot 176. When the clutch pedal 8 is released substantially to a position wherein the clutch elements are beginning to contact during the reengaging operation, the disc 166 will assume such a position that the cam surface 181 will move the dog 178 backwardly and release it from the teeth. This will release the valve element 164, and, since it is acted on by the torsional spring 173, it will then snap to its closed position. With the specially constructed shut-off valve 148 just described, it is seen that the valve, whether fully or partially opened, depending on the extent of clutch pedal movement beyond clutch disengaged condition, will not move toward closed position until the clutch pedal is released to a position wherein the clutch elements begin to reengage, at which time the valve will then become closed automatically with a snap-action independently of clutch pedal movement. This provides for the operator to open the valve and then maintain it open even though he should release the clutch pedal to a position wherein the clutch elements are about to be engaged. If the clutch pedal were directly connected to the valve element 164, so that the valve element moved at all times directly with the clutch pedal during any movement thereof, it would not be possible to close the valve quickly from a fully opened position to a fully closed position as is possible with the arrangement just described. The valve arrangement described is also very helpful to the vehicle operator as it will remain open to maintain the power-shifting mechanism energized to complete its function and thus avoid the possibility of an incompleted shifting operation usually resulting from too quick a closing of the clutch pedal controlled valve when directly connected to said pedal. This may be due to the operator desiring to release the clutch pedal to a more comfortable position after a full depressing movement thereof as required to fully open the valve so that a shift can occur.

*Operation*

In a vehicle having its change-speed gearing controlled by the previously described control mechanism, it will be seen that when the gear-shift lever is in a position wherein the pointer is opposite N, the gearing will be in neutral condition and the parts of the control mechanism will be as indicated in Figures 1, 2, 3, 8, 11, 14, 17, 19 and 21. If the vehicle is stopped with the engine not running and the clutch pedal in clutch engaged position, the shut-off valve 148 will be closed in addition to the shut-off valve 146. In starting the engine, the clutch will be disengaged by a forward or depressing movement of the clutch pedal. This will open the shut-off valve 148, but, since the shut-off valve 146 is still in closed position, there will be no communication between the source of suction and the motor-shifter 96. When the gearing is in neutral condition, it is also to be noted that outward movement of the selector sleeves 65—66 for the second and high gear ratios is mechanically prevented by the roller 157 of the valve 146 being in the depression 158. The same will be true when the gearing is in low or reverse gear ratio, as then the roller will be in the depressions 159 or 160. Thus a positive interlock is established, preventing operation of second (intermediate) and high speed drives when they are not desired.

If it should be desired to obtain low or reverse speed drive, this can be accomplished by merely depressing the clutch pedal and then setting the gear-shaft lever in the L or R positions, depending upon which gear ratio is desired. The result will be such a manual rotation of the shaft 36 that the desired gear ratio will be established by a proper movement of the gear shifting fork 72 by the S-cam slot in a manner already apparent. In Figure 6, the shifting fork 32 is shown in the reverse gear ratio position. The dashed lines indicate the low speed position. During this manual establishment of the low or reverse speed, there will be no operation of the servomotor or power device 96. The piston of the power device will be at the rear end of its cylinder, as shown in Figure 11. Since the accelerator pedal will be fully released during the shifting operation, the control valve 121 for the distributing valve 108 of the servo-mechanism 96 will be in the position shown in Figure 14. Consequently the rear end of the shifting-motor 96 will be connected to the pipe 119, and, regardless of the fact that during the establishing of the low or reverse speed both shut-off valves 146 and 148 may be open momentarily, the power-shifter will not in any way be actuated because the source of suction, when placed in communication with the power cylinder, will so act on the piston 98 that it cannot produce any movement of the piston.

It is to be noted that when the reverse speed is established, the pin 74 will enter the slot 72 in the sleeve 65, and, when the low speed is established, the pin 74 will enter the slot 73 in the sleeve 66. Either of these conditions will lock up the sleeves in their innermost position (both being connected together by the bell crank levers), and will consequently prevent any operation of the power cylinder even though the manipulation of the accelerator pedal may result in some subatmospheric pressure momentarily entering the forward end of the power cylinder, tending to operate the piston therein. This, however, could not happen, because whenever low or reverse speed is established the shut-off valve 146 will be closed due to the fact that the roller 158 on the valve stem will be in either depression 159 or 160. The arrangement whereby the pin 74 mechanically locks up the operation of the power cylinder is added assurance that there will be no operation of the power cylinder. With the roller in a depression 159 or 160, further mechanical locking is present.

If it is desired to establish intermediate or second speed ratio, this is accomplished by the operation of the fluid-pressure actuated motor 96, which operation is brought about by manipulation of the accelerator pedal. In establishing intermediate speed, the gear-shift lever is first set so that the pointer is opposite the letter I. This so rotates the shaft 36 and the sleeves 65 and 66 that the locking pin 87 will drop into the notch 91, thus connecting the sleeve 66 and the gear shifting fork 41 to the sleeve 66. Rotation of the sleeve 66 also will result in the opening of the shut-off valve 146. The conduit 119 will now be placed in communication with the engine intake manifold since the clutch pedal has already been previously depressed to disengage the engine clutch, and, therefore, the shut-off valve 148 placed in open position. If now the accelerator pedal is slightly depressed from its fully released engine idling position, the power cylinder 96 will be operated so that the sleeves 65 and 66 will be moved away from each other, the sleeve 66 carrying with it the gear shifting fork 31 and resulting in the intermediate speed being established. The operation of the power cylinder is brought about by the accelerator being slightly depressed and prior to speeding up of the engine, due to the fact that atmospheric pressure is admitted into the chamber 133 of the selector control valve 121 by opening of the valve controlled directly by the accelerator pedal. Since suction is effective in the chamber 129 at the time that atmospheric pressure is admitted to the chamber 133, the valve element 123 of the control valve will be snapped over to the position shown in Figure 15. This places atmospheric pressure in the chamber 107 and causes the distributing valve sleeve 105' to be moved to the position shown in Figure 12. The result will be that the forward end of the power cylinder will be placed in communication with the suction manifold, and, consequently, the piston 98 will be moved to the forward end of the cylinder 97. This will operate the two bell crank levers 77 and 81, and move the sleeves 65 and 66 away from each other to bring about the establishment of the intermediate speed. The positions of the gear shifting fork 31 and the sleeves when intermediate speed is established are shown in Figure 4. If the clutch pedal is now fully released, the shut-off valve 148 will become closed, and the vehicle can be driven forwardly in the intermediate speed by merely speeding up the engine with a further depressing of the accelerator pedal. If the vehicle is in intermediate speed, it will so remain in this condition as long as the clutch pedal is not depressed and the shut-off valve 148 again opened. Thus, regardless of the releasing of the accelerator pedal, there will be no shifting since the power cylinder cannot be caused to be in communication with the source of sub-atmospheric pressure.

When the vehicle is being driven in intermediate speed, the operator may preselect high speed if he so desires. This is accomplished by merely moving the gear-shift lever 62 so that the pointer is opposite the letter H. When such is done, the shaft 36 is given such a rotation as to unlock the gear shifting fork 31 with the sleeve 66 and to condition the locking pin 87 so that it can drop into the recess 90 and lock the fork 31 to the sleeve 65 whenever the sleeves are moved to their innermost position by an operation of the power cylinder. After making this preselection, the establishment of the high speed may be accomplished at any time by merely fully depressing the clutch pedal to thereby open the shut-off valve 146, together with the full releasing followed by slight depressing of the accelerator pedal. When the accelerator pedal is released, the selector control valve 121 will be conditioned so that sub-atmospheric pressure can be effective on both sides of the diaphragm 131. Upon opening of the shut-off valve 148, this condition will prevail. Consequently the valve element 123 will assume the position shown in Figure 14. This will connect the chamber 107 to atmosphere so that the spring 113 can move the distributing valve sleeve 105' to the position shown in Figure 11. The rear end of the power cylinder 96 will now be connected with the engine manifold, and the piston 98 moved to this rear end, which will result in the sleeves 65 and 66 being moved to their innermost positions, as shown in Figure 3, and the shifting fork 31 carried back to its neutral position by the boss 81' of the upright arm 81 bearing against the end of the collar 86. However, the connection between the pin 87 and the recess 90 can return the second gear to neutral position alone if a new selection is not made. When these positions are reached, the locking pin 87 will then drop into the recess 90 and connect the shifting fork 31 to the sleeve 65. With the clutch still disengaged, the accelerator pedal may now be slightly depressed, and this will immediately result in the conditioning of the selector control valve in the same manner as for second speed so that the distributing valve sleeve 105 will assume a position for connecting the forward end of the power cylinder to the source of sub-atmospheric pressure. The piston 98 will then move the sleeves 65 and 66 outwardly, and the sleeve 65 will carry with it the shifting fork 31 to establish the high speed. The position of the shifting fork 31 and the sleeves 65 and 66 when high speed is established is shown in Figure 5.

With high speed established, intermediate speed may be preselected at any time by merely moving the gear-shift lever so that the pointer is at the I position. Whenever second speed is desired, it can be established by merely fully releasing the accelerator pedal, depressing the clutch pedal, and then slightly depressing the accelerator pedal from its fully released position. It is believed to be obvious, from what has already been described, that the shift to second speed will then take place.

When the accelerator pedal is fully released and the clutch is disengaged with high or intermediate speed established, the power cylinder 96 will always be so operated as to bring the sleeves 65 and 66 to their innermost positions. This operation neutralizes the gearing. The gearing, now neutralized, can be maintained in neutral position by merely moving the gear-shift lever so that the pointer is opposite the letter N. If the gear-shifting lever is left in I or H position, the neutralized gear ratio can be reestablished by slightly depressing the accelerator pedal. It will remain neutralized, however, if the accelerator is not depressed. Return of the clutch pedal and closing of the valve 148 will result in neutral being maintained.

If the gear-shift lever should be moved to the N position before the clutch pedal is depressed and while the accelerator pedal is released, there will be a preselection of neutral. Neutralization of the gearing may be effected, since under these conditions the shut-off valve 146 is open, due to the fact that the sleeve 66 is in its outermost position while second or high speed ratio is established. Consequently the valve stem roller 157 will be riding on the surface of the sleeve 66. Neutralization will be accomplished upon a depression of the clutch pedal and opening of the shut-off valve 148. This will now cause such operation of the power cylinder as to neutralize the gearing. Thus it is seen that, regardless of whether the gear-shift lever is moved to the N position either before or after depressing the clutch pedal, neutralization will be accomplished and maintained until the lever is again moved to a speed setting.

It is to be particularly noted, in connection with the described control mechanism, that it is not necessary to depress or release the clutch pedal each time a shift between second and high is desired. As long as the clutch pedal is released and the valve 148 is open, second and high speeds may be alternately obtained at will merely by slightly depressing and fully releasing the accelerator pedal. This depressing and releasing of the accelerator pedal will result in such operation of the selector control valve 121 and the distributing valve 108 that the piston 98 of the fluid-pressure motor 96 will be operated back and forth. Thus, by setting the gear-shift lever alternately to H and I positions, there will be alternate shifting whenever the accelerator pedal is depressed and released after making the speed selection by the gear-shift lever.

A neutralization of high or second gear ratio need not take place each time the accelerator pedal is released and the engine clutch is disengaged. Opening of the shut-off valve 148 does not begin to take place until the clutch is just disengaged. Consequently the power cylinder can be prevented from operating as long as this valve is not opened. Thus the operator, by moving the clutch pedal just sufficiently to disengage the clutch, can "cut-off" the transmission of power through the gearing without neutralizing the gearing, notwithstanding the fact that the accelerator pedal is fully released with the engine idling.

The selector control valve 121 for the distributing valve 108 is sensitive, and therefore acts quickly. Immediately upon slightly depressing of the accelerator pedal and the connecting of the chamber 133 with atmosphere, differential pressure, acting upon the diaphragm 131, will "flick" the valve from the position shown in Figure 14 to the position shown in Figure 15. As soon as this valve is flicked over, instant operation of the distributing valve sleeve 108 will result to bring about the proper connection of the source of sub-atmospheric pressure with one end of the power cylinder. This will all occur without change in sub-atmospheric pressure in the engine manifold as the engine has not as yet had its speed increased above idling speed.

In the foregoing description, it is seen that in this improved control valve means the operator has instant and efficient control over the establishment of the various transmission speeds of the gearing. Low and reverse gear ratios are manually established and neutralized in the usual manner of gear-shift lever and clutch pedal manipulations. Second and high gear ratios, which are employed more frequently, are power-operated, and the establishment of these speeds is accomplished merely by an effortless minute depressing operation of the accelerator pedal whenever the engine clutch is disengaged. The arrangement also provides for preselection of the second and high speed drives, thus enabling the vehicle operator to anticipate the necessity for a certain gear ratio and attain it with a minimum of effort whenever the required condition prevails. All of the control mechanism is of simple construction and is easily associated with present change-speed gearing design. All the mechanism is carried by the transmission cover plate or is mounted in a readily accessible place on the exterior of the gearing housing or other part of the vehicle. Thus, to employ my improved control mechanism, it is not necessary to alter the change-speed gearing design and associated mechanism employed in driving the vehicle. A novel shut-off valve controlled by the clutch pedal enables full sub-atmospheric pressure to be effective through the valve at all times after the valve is fully opened, regardless of a partial release of the clutch pedal from the floorboard position. The valve does not close until there is initial contact of the clutch elements during the clutch engaging movement of the clutch pedal, and when this contact takes place there will immediately follow a quick and complete closing of the valve from its fully open position independent of any further releasing movement of the clutch pedal.

It will be understood that modifications and variations may be effected without departing from the scope of the novel concepts of the present invention.

I claim as my invention:

1. In a speed-changing control mechanism for a vehicle provided with a change-speed transmission and with a vehicular control member movable to different positions in controlling the operation of the vehicle, a fluid motor for controlling the transmission, conduit means for connecting the fluid motor to a source of pressure different from atmosphere, a shut-off valve means for the conduit means, means for opening the valve means when the vehicular control member is moved from one predetermined position to another predetermined position, means for maintaining the valve means in said open condition during a portion of the return movement of said vehicular control member, means for releasing said maintaining means when the control member has further return movement, and means for fully closing said valve after said maintaining means is released and independently of continued return movement of the vehicular control member to its first predetermined position.

2. In a transmission control mechanism for association with a vehicle having a clutch operating mechanism, a fluid motor for controlling the transmission, conduit means for connecting the fluid motor to a source of fluid pressure different from atmosphere, a shut-off valve for the conduit means having a movable element biased toward closed position, means for moving the element to fully open the valve means when the clutch operating mechanism is moved additionally to that movement required to disengage the clutch, means for locking said valve element in said fully open position, means providing for the clutch operating mechanism to have such independent movement of the valve element that it can be released substantially to a position wherein the clutch is initially re-engaging without moving the valve element, and means for releasing the locking means to accommodate closure of the valve element independently of continued releasing movement of the clutch operating mechanism to fully re-engage the clutch.

3. In a transmission control mechanism for a vehicle having an engine, a transmission, a clutch therebetween, and a clutch operating mechanism, a fluid motor for controlling the transmission, conduit means for connecting the fluid motor with a source of fluid pressure different from atmosphere, a shut-off valve means for the conduit means, means for opening the valve means when the clutch operating mechanism is moved additionally to that required to disengage the clutch, means for maintaining said valve means in said open condition during release of the clutch operating mechanism to a position substantially wherein the clutch is initially re-engaging, and means for fully closing the valve means when the clutch operating mechanism is further released, said closing being independent of movement of the clutch operating mechanism after said closing means becomes operative.

4. In a control mechanism for a change-speed transmission having a plurality of speed drives, two shifting members, a rotatable member, means operable by a rotation of the last-named member to shift one of the shifting members, means for moving the other shifting member to different positions to establish different speed drives, means operable by the rotatable member for selecting which speed drive will be established by the moving means, said selecting means being operable by the rotatable member being in positions other than that required to shift the first shifting member, and means for preventing operation of the first shifting member when the rotatable means is moved to operate the selecting means.

5. In a control mechanism for a change-speed transmission having a plurality of speed drives, two shifting members, a rotatable shaft, means for rotating the shaft, means for shifting one member by a rotation of the shaft to predetermined positions, two members movable toward and away from each other, means for moving said last-named members independently of the shaft rotating means, and means for selectively connecting the other of said shifting members to the said two members by a rotation of the shaft to other predetermined positions.

6. In a control mechanism for a change-speed transmission having a plurality of speed drives, two shifting forks, a rotatable shaft, means for rotating the shaft in opposite directions, means for slidably mounting one of the forks on the shaft, means for moving the said last-named one fork in the opposite direction by a rotation of the shaft from a predetermined position, two sleeves mounted on the shaft for rotation therewith, means for moving the sleeves on the shaft toward and away from each other, and means for selectively connecting the sleeves to the other shifting fork by a rotation of the shaft.

7. In a control mechanism for a change-speed transmission having a plurality of speed drives, two shifting members, a rotatable shaft, means for rotating the shaft, means for shifting one member by a rotation of the shaft to predetermined positions, two members movable toward and away from each other, means for moving said members independently of the shaft rotating means, means for selectively connecting the other shifting member to the said two members by a rotation of the shaft to other predetermined positions, and means for mechanically locking the two movable members from movement by their moving means when the shaft is rotated to the first predetermined position for moving the first shifting member.

8. In a control mechanism for a change-speed transmission, a speed drive changing member, a fluid motor having a movable element, oppositely movable members operatively connected to be moved conjointly in opposite directions by movement of the element, rotatable means for selectively connecting the speed drive changing member to either of the movable members, conduit means for connecting a source of pressure different from atmosphere to said fluid motor, control valve means for the motor, a shut-off valve in the conduit means between the source and the control valve means, and means for controlling the shut-off valve by the rotatable means.

9. In a control mechanism for a change-speed transmission having an engageable and disengageable friction clutch associated therewith, a speed drive changing member, a fluid motor having a movable element, oppositely movable members connected to be moved conjointly in opposite directions by movement of the element, rotatable means for selectively connecting the speed drive changing member to either of the movable members, conduit means for connecting a source of pressure different from atmosphere to the fluid motor, control valve means for the motor, a shut-off valve in the conduit means between the source and the control valve means, means for controlling the shut-off valve by the rotatable means, a second shut-off valve in the conduit means, and means for opening the second shut-off valve means when the friction clutch is disengaged.

10. Control means for the changeable speed transmission of an automobile or the like having a manually-operable fuel controlling element operable toward and from an extreme position for changing the speed of operation of the automobile engine; comprising selecting means operable to select different changes of the transmission, power means energizable to effect the changes selected by the selecting means, energizing means for said power means, and control mechanism to control energization of the power means, including means operated by the fuel controlling element in a direction away from its extreme position to cause energization of the power means to effect said selected change.

11. Control means for the changeable speed transmission of an automobile or the like having an accelerator pedal yieldably operable to and normally urged into a fully released position wherein the engine of the automobile idles, and operable away from that position to increase the speed of the engine; comprising selector means operable to select different changes of the transmission, power means energizable to effect the changes selected by the selecting means, energizing means for said power means, and means operated only by movement of the accelerator pedal from said engine idling position in an engine accelerating direction to cause energization of the power means to effect the selected change.

12. Control means for the changeable speed transmission of an automobile or the like having an accelerator pedal yieldably operable to and normally urged into a fully released position wherein the engine of the automobile idles, and operable away from that position to increase the speed of the engine; comprising selector means operable to select different changes of the transmission, power means energizable to effect the changes selected by the selecting means, energizing means for said power means, and control means operable to a first position to prevent energization of the power means and operable to a second position to cause energization of the same, said control means being connected with the accelerator pedal to be operated to its first, deenergizing position when the accelerator pedal is in released position, and to be operated to its second, energizing position when the accelerator pedal is moved from its released position in the engine-accelerating direction.

13. Control means for the changeable speed transmission of an automobile or the like having an accelerator pedal yieldably operable to and normally urged into a fully released position wherein the engine of the automobile idles, and operable away from that position to increase the speed of the engine; comprising power means operable to effect changes of the transmission, operating means for said power means, a control device for rendering the power means operable and inoperable, the control device including a first control element connected to the accelerator pedal to move therewith, and a second control element connected to the accelerator mechanism to be moved therewith, and yieldable means normally urging the two elements apart, said yieldable means being weaker than the return spring of the accelerator pedal, whereby when the pedal is depressed the elements are brought together, but when the pedal is released the elements are separated.

14. Control means for the changeable transmission of an automobile or the like, comprising a first control movable to first and second positions, a second control movable to operable and inoperable positions, selector means movable to position to neutralize the transmission and to position to select a driving operation of the transmission; power means to effect the changes of the transmission between neutralizing and driving operations thereof; means including the first control to cause the power means to neutralize the transmission from its driving operation whenever the first control is moved to its second position; and means including the second control in second position and the first control in second position to cause the power means to operate to its driving condition.

15. Control means for the changeable transmission of an automobile or the like, comprising a first control movable to first and second positions, a second control movable to operable and inoperable positions, selector means movable to position to neutralize the transmission and to position to select a driving operation of the transmission; power means to effect the changes of the transmission between neutralizing and driving operations thereof; means including the first control to cause the power means to neutralize the transmission from its driving operation whenever the first control is moved to its second position; and means including the second control in second position and the first control in second position to cause the power means to operate to its driving condition, the second control comprising the accelerator pedal of the automobile, and being connected therewith to operate to first position upon release of the accelerator pedal and to operate to second position upon depression of the accelerator pedal.

16. Control means for the changeable transmission of an automobile or the like, comprising a first control movable to first and second positions, a second control movable to operable and inoperable positions, selector means movable to position to neutralize the transmission and to position to select a driving operation of the transmission; power means to effect the changes of the transmission between neutralizing and driving operations thereof; means including the first control to cause the power means to neutralize the transmission from its driving operation whenever the first control is moved to its second position; and means including the second control in second position and the first control in second position to cause the power means to operate to its driving condition, the second control comprising the accelerator pedal of the automobile, and being connected therewith to operate to first position upon release of the accelerator pedal and to operate to second position upon depression of the accelerator pedal, the first control comprising the clutch pedal of the automobile, and being connected therewith to operate to second position upon depression of the clutch pedal.

17. In a control mechanism for a vehicle change-speed transmission associated with an engine having an accelerator mechanism normally urged to a released position and movable therefrom in an engine accelerating direction, and having a free range of movement from normally released position to an engine operating condition but without changing the engine operation, a speed drive changing member, power operated means operably connected to said member to move the same, selecting means operable for preselecting a speed drive to be established by operation of the power operated means and regardless of the condition of the transmission, and control means for controlling the operation of the power means by movement of the accelerator mechanism within its free range of movement to thereby establish the preselected speed drive and to neutralize an established speed drive.

18. In a control mechanism for a vehicular drive system including an internal-combustion engine, a power train having selective speed drives and coupling means for transmitting torque between said engine and said selective drives; the improvements which comprise a speed-changing member for actuating said power train to render active selective drives thereof, power-operated means operatively connected to said member for actuating the same, means operable to preselect a speed drive to be rendered active upon operation of said power-operated means, an accelerator pedal having a range of movement for engine acceleration and a separate range of movement, and control means for said power-operated means, said control means being responsive to movement of said accelerator pedal in said separate range toward said engine acceleration range of movement to effect operation of said power-operated means to render active a preselected speed drive.

19. In a control mechanism for a vehicle change-speed transmission receiving torque from an engine having an accelerator pedal depressible and elevatable within a range of free movement outside the range of pedal movement for operating the engine, a transmission speed-changing member, actuable means for interrupting torque reception by said transmission, power-operated means operably connected to said member to move the same, means operable for preselecting a speed drive to be established by operation of said power-operated means and irrespective of the condition of the transmission, and control means for controlling the operation of the power means by movement of the accelerator pedal so that the preselected speed drive will be established when the pedal is depressed within its range of free movement and an established speed drive will be neutralized when the element is elevated within its free range of movement and said torque-interrupting means is actuated.

20. In a vehicular drive system including a torque-producing engine having an accelerator mechanism provided with a movable pedal having a range of free movement into and out of a fully released position without changing the engine operation, a torque-transmitting coupling, and a change-speed gearing receiving engine torque through said coupling, means for receiving torque-load on said transmission, an actuatable speed drive changing member movable to one position for establishing a speed drive in said transmission and to another position for neutralizing a speed drive of said transmission, a fluid motor having a movable element, means operably connecting said motor element to actuate the speed drive changing member, conduit means for connecting the fluid motor with a source of fluid pressure different from atmosphere, a control valve means for the fluid motor, and means controlled by the accelerator pedal when moved from its fully released position within its range of free movement for causing the fluid motor to establish a speed drive in the transmission and when moved to its fully released position but within its range of free movement for causing the fluid motor to neutralize an established speed drive upon the relief of torque-load on said transmission.

21. In a control mechanism for association with an engine accelerator mechanism having a pedal freely movable from a normally inoperative position toward and from an engine operating range and without changing the engine operation, and with a change-speed transmission having a speed drive controlling element movable in one direction to establish one speed drive in the transmission and movable in an opposite direction to establish another speed drive therein, members movable conjointly toward and away from each other, means for selectively connecting the controlling element to either of the movable members, power means for moving said movable members to cause the element to establish a particular speed drive preselected by the selective connecting means, and control means for said power means comprising means controlled by movement of the accelerator mechanism pedal within its range of free movement.

22. In a control mechanism for association with an engine accelerator mechanism having a pedal freely movable from a normally operative position toward and from an engine operating range and without changing the engine operation and with a change-speed transmission having a speed drive controlling element movable in one direction to establish one speed drive in the transmission and movable in an opposite direction to establish another speed drive therein, members movable conjointly toward and away from each other, means for selectively connecting the controlling element to the movable members, a fluid motor having its element operatively connected for moving said movable members to cause the element to establish a particular speed drive predetermined by the selective connecting means, conduit means for connecting the motor to a source of fluid pressure different from atmosphere, and control means for said power means comprising valve means controlled by movement of the accelerator pedal within its range of free movement.

23. In a control mechanism for a vehicular change-speed transmission associated with an engine having an accelerator mechanism provided with a pedal having a range of free movement without changing the engine operation, two speed drive changing members, first means operable for moving one of the said speed changing members to establish a speed drive, separate power-operated means connected to move the other speed drive changing member, means for preselecting either of two speed drives to be established by operation of the power-operated means and comprising means operable by the same first means employed to establish the first-named speed drive, and means for controlling the operation of the power means by the moving of the pedal of the accelerator mechanism within its range of free movement to thereby establish the preselected speed drive.

24. In a control mechanism for a vehicle change-speed transmission associated with an engine having an accelerator mechanism provided with a depressible pedal having a range of free movement without changing the engine operation and with a torque-transmitting clutch interposed between said engine and said transmission, and a clutch operating mechanism for engaging and disengaging said clutch, a speed drive changing member movable to a first position for establishing a speed drive and to another position for neutralizing a speed drive, a fluid motor having a movable element, means operably connecting the motor element to the speed drive changing member to move the same, conduit means for connecting the fluid motor with a source of fluid pressure different from atmosphere, control valve means for the fluid motor, means controlled by the accelerator mechanism when said pedal is depressed within its range of free movement for causing the fluid motor to establish a speed drive and when elevated within its range of free movement for causing the fluid motor to neutralize an established speed drive, and shut-off valve means associated with the conduit means for preventing operation of the motor when the clutch is engaged by its operation mechanism.

25. In a control mechanism for association with an engine accelerator mechanism having a pedal freely movable from a released position prior to changing the engine operation and with a change-speed transmission having a speed drive controlling element, members movable toward and away from each other, means for selectively connecting the controlling element to the movable members, manual means for operating the selective connecting means, power means for moving said movable members to cause the element to selectively establish speed drives of said transmission, control means for said power means comprising means controlled by movement of the accelerator mechanism pedal within its range of free movement, and means for disabling the power means by the manual means.

26. In a control mechanism for association with a torque-producing engine provided with an accelerator mechanism having a pedal freely movable from a released position through a limited distance prior to changing the engine operation, with a change-speed transmission having a speed drive controlling element and with a friction clutch, a fluid motor having a movable element, manual means operatively connecting the motor element to move the speed drive controlling element to establish and neutralize a speed drive, conduit means for connecting the fluid motor with a source of fluid pressure different from atmosphere, a control valve, means for operating the control valve including means controlled by free movement of the accelerator mechanism pedal within said limited distance, and shut-off valve means for disabling the motor when said friction clutch is engaged.

27. In combination with a vehicle change-speed transmission associated with an engine having an accelerator mechanism provided with a movable and normally controlled pedal having a normally released position, a member to be shifted, means operated by shift of the member to operate the transmission to produce a speed change therein, power means having a movable element connected to move the member, means for controlling the power means comprising a movable fluid pressure-responsive control member, the opposing surfaces of which are subject to fluid pressure from a source different from atmosphere, and means operable by movement of the accelerator mechanism pedal when moved from released position toward an engine operating position for changing the pressure effective on one surface of said fluid pressure-responsive control member so as to produce a differential pressure thereon for actuating the member and thereby control operation of the power means.

28. In combination with a change-speed transmission having a member to be shifted to produce a speed change in the transmission, a fluid motor having a movable element connected to move the member, conduit means for connecting a source of fluid pressure different from atmosphere to the motor, valve means for controlling actuation of said motor, and means for controlling the valve means by fluid pressure from the source comprising a shiftable control member actuatable in response to differential fluid pressure exerted on opposing sides thereof, means for venting pressure from the source to opposed surfaces of said shiftable member, means operable to change the differential pressure effective on said opposing surfaces of said member for moving the member and thereby cause operation of the valve means to regulate operability of the motor by operation of the valve means, and additional control means operable to operate and to prevent operation of the fluid motor.

29. In a control mechanism for a change-speed transmission having a member to be shifted, a fluid motor having a movable element operably connected to said member to move the same, conduit means for connecting a source of fluid pressure different from atmosphere to the motor, valve means in said conduit means having a movable element for controlling the operation of said motor, means comprising actuatable control valve means for controlling movement of the element of said first valve means, a pressure-responsive member for actuating said control valve means, said pressure-responsive member having opposed surfaces each subject to pressure from the source, and means operable at will for varying the pressure effective on one surface of said pressure-responsive member without a change in the pressure of the source so as to produce a differential pressure effective on said pressure-reponsive member to thereby actuate said control valve means.

30. In a control mechanism for a change-speed transmission, two shifting members, a shift-lever movable in a single plane, means for manually moving a first of said shifting members by moving the shift-lever to and from a predetermined position in said plane, power means for shifting the other of said shifting members, and means for connecting and disconnecting the power means and said other shifting member by a movement of the shift lever to and from a second predetermined position in said plane, said first-named shifting member being stationary when the shift-lever is moved to the second predetermined position.

31. In a control mechanism for a change-speed transmission having a plurality of speed drives, a rotatable member, means for rotating the member, means operable by a predetermined rotation of the member for establishing certain of the speed drives, means operable by other predetermined rotations of the member for selecting either of two of said speed drives, and means for establishing a selected one of said two speed drives independently of rotation of the rotatable member.

32. In a control mechanism for a change-speed transmission having a plurality of speed drives, a rotatable member, means for rotating the member, means operable by a predetermined rotation of the member for establishing a certain of said speed drives, means operable by other predetermined rotations of the member for selecting either of two others of said speed drives, means for establishing the selected speed drive independently of rotation of the rotatable member, and locking means for preventing the establishment of the said certain of the speed drives when the rotatable member selects one of the said others of said speed drives and for preventing the establishment of either of said others of said two speed drives when the said certain speed drive is established by the rotatable member.

33. In a control mechanism for a change-speed transmission having a plurality of speed drives, two shifting members, a rotatable member, means operable by a rotation of the member to shift one of the shifting members, additional means for moving the other shifting member to different positions to establish different speed drives, said additional means being movable selectively with respect to the different speed drives, and means operable by the rotatable member for selecting which speed drive will be established by the moving means.

34. In combination, an engine having an accelerator pedal movable toward and from an extreme position to effect changes in engine speed, a variable-speed drive transmission connected to the engine and having an output shaft, and means to provide two different speed drives between the engine and the transmission output shaft; power means energizable to operate either drive means; energizing means for said power means; means to predetermine which speed drive can be established by the power means when operated; and control mechanism to control energization of the power means, including means operated by movement of the accelerator pedal from its extreme position to cause energization of the power means to establish the predetermined speed drive.

GLENN T. RANDOL.

(References on following page)

REFERENCES CITED

The following references are of record in the file of this patent:

UNITED STATES PATENTS

| Number | Name | Date |
|---|---|---|
| 905,637 | Beskow | Dec. 1, 1908 |
| 1,669,438 | Aikman | May 15, 1928 |
| 1,994,835 | Sanford et al. | Mar. 19, 1935 |
| 2,109,443 | Hill et al. | Feb. 22, 1938 |
| 2,129,083 | Carter et al. | Sept. 6, 1938 |
| 2,157,328 | Durham | May 9, 1939 |
| 2,250,835 | Kliesrath et al. | July 29, 1941 |
| 2,263,400 | Schwarz | Nov. 18, 1941 |
| 2,275,779 | MacPherson | Mar. 10, 1942 |
| 2,291,411 | Randol | July 28, 1942 |
| 2,292,253 | Thurber | Aug. 4, 1942 |
| 2,296,290 | Mayrath | Sept. 22, 1942 |
| 2,349,297 | Neracher et al. | May 23, 1944 |
| 2,358,846 | Andres | Sept. 26, 1944 |

Certificate of Correction

Patent No. 2,581,291                                                        January 1, 1952

GLENN T. RANDOL

It is hereby certified that error appears in the above numbered patent requiring correction as follows:

In the grant, line 6, in the heading to the drawing sheets 1 to 6, line 2, and in the heading to the printed specification, line 2, title of the invention, before "PRESELECTIVE" insert *AUTOMOTIVE*; in the printed specification, column 5, line 61, before "friction" insert *the*; column 16, line 24, for "gear-shaft" read *gear-shift*; column 24, line 68, for "actuable" read *actuatable*; column 26, line 50, for "operation" read *operating*;

and that the said Letters Patent should be read as corrected above, so that the same may conform to the record of the case in the Patent Office.

Signed and sealed this 29th day of April, A. D. 1952.

[SEAL]

THOMAS F. MURPHY,
                                                    *Assistant Commissioner of Patents.*